(12) United States Patent
Crotty et al.

(10) Patent No.: US 6,837,923 B2
(45) Date of Patent: Jan. 4, 2005

(54) POLYTETRAFLUOROETHYLENE DISPERSION FOR ELECTROLESS NICKEL PLATING APPLICATIONS

(76) Inventors: David Crotty, 31 Woodside Park Blvd., Pleasant Ridge, MI (US) 48069; Jon Bengston, 70 Bonny View Dr., West Hartford, CT (US) 06107

( * ) Notice: Subject to any disclaimer, the term of this patent is extended or adjusted under 35 U.S.C. 154(b) by 90 days.

(21) Appl. No.: 10/431,251

(22) Filed: May 7, 2003

(65) Prior Publication Data

US 2004/0221765 A1 Nov. 11, 2004

(51) Int. Cl.⁷ .................. C23C 18/36; C08L 27/18; C08K 5/54
(52) U.S. Cl. ............. 106/1.22; 106/1.27; 524/544; 524/386
(58) Field of Search ............... 106/1.22, 1.27; 524/544, 386

(56) References Cited

U.S. PATENT DOCUMENTS

| | | |
|---|---|---|
| 3,677,907 A | 7/1972 | Brown et al. |
| 4,160,707 A | 7/1979 | Helle et al. |
| 4,302,374 A | 11/1981 | Helle et al. |
| 4,347,278 A | 8/1982 | Flautt et al. |
| 4,370,376 A | 1/1983 | Gangal et al. |
| 4,514,537 A | 4/1985 | Cavanaugh |
| 4,716,059 A | 12/1987 | Kim |
| 4,728,398 A | 3/1988 | Paulet et al. |
| 4,830,889 A | 5/1989 | Henry et al. |
| 4,997,686 A | 3/1991 | Feldstein et al. |
| 5,145,517 A | 9/1992 | Feldstein et al. |
| 5,232,744 A | 8/1993 | Nakamura et al. |
| 5,300,330 A | 4/1994 | Feldstein et al. |
| 5,660,704 A | 8/1997 | Murase |
| 5,674,631 A | 10/1997 | Feldstein |
| 5,853,557 A * | 12/1998 | Souza et al. ............ 205/109 |
| 5,863,616 A | 1/1999 | Feldstein |
| 6,114,448 A * | 9/2000 | Derbes .................... 525/104 |
| 6,156,390 A | 12/2000 | Henry et al. |
| 6,277,906 B1 | 8/2001 | Biancardi et al. |
| 6,359,044 B1 | 3/2002 | Biancardi et al. |
| 6,498,207 B1 * | 12/2002 | Hoshikawa et al. ...... 524/378 |
| 6,518,352 B1 * | 2/2003 | Visca et al. ............. 524/520 |
| 6,660,798 B1 * | 12/2003 | Marchese et al. ........ 524/520 |
| 2003/0045645 A1 * | 3/2003 | Chang et al. ............ 525/328.7 |

FOREIGN PATENT DOCUMENTS

| | | |
|---|---|---|
| WO | WO 00/31175 | 2/2000 |
| WO | WO 00/31178 | 2/2000 |
| WO | WO 00/31180 | 2/2000 |

* cited by examiner

*Primary Examiner*—Helene Klemanski
(74) *Attorney, Agent, or Firm*—Carmody & Torrance LLP

(57) ABSTRACT

A low viscosity silicone glycol surfactant together with glycerin is added to a polytetrafluoroethylene dispersion for use with an electroless nickel plating bath. The improved plating bath produces a stable PTFE dispersion that continues to work as the plating bath ages and that produces an electroless nickel deposit with greater than 20 percent by volume of PTFE in the deposit.

26 Claims, No Drawings

POLYTETRAFLUOROETHYLENE DISPERSION FOR ELECTROLESS NICKEL PLATING APPLICATIONS

FIELD OF THE INVENTION

This invention relates to an electroless composite plating bath comprising nickel and a dispersion of polytetrafluoroethylene (PTFE) capable of forming a composite film on the surface of a substrate.

BACKGROUND OF THE INVENTION

Electroless plating refers to the autocatalytic or chemical reduction of aqueous metal ions plated on a base substrate. Deposits made by electroless plating have unique metallurgical characteristics. The coatings may have good uniformity, excellent corrosion resistance, wear and abrasion resistance, nonmagnetic and magnetic properties, solderability, high hardness, excellent adhesion, and low coefficient of friction. The deposits can be made onto a wide range of substrates, including both metallic and nonmetallic surfaces.

Electroless bath compositions typically contain an aqueous solution of metal ions to be deposited, catalysts, one or more reducing agents, one or more complexing agents and bath stabilizers, all of which are tailored to specific metal ion concentration, temperature and pH range. In electroless metal depositing, use is made of a chemical reducing agent, thus avoiding the need to employ an electrical current as required in conventional electroplating operations.

In an electroless plating process, metal ions are reduced to metal through the action of chemical reducing agents serving as electron donors. The metal ions are electronic acceptors, which react with the electron donors to form a metal that becomes deposited on the substrate. The catalyst is simply the surface provided to the bath, which serves to accelerate the electroless chemical reaction to allow oxidation and reduction of the metal ion to metal.

One of the most common electroless plating operations involves the electroless deposition of nickel or a nickel alloy. A plating bath of this type generally comprises at least four ingredients, namely, a source of nickel ions, a hypophosphite compound as a reducing agent, an acid or hydroxide pH adjusting compound, and a complexing agent for the metal ions to prevent their premature precipitation.

The uniform dispersion of micron or sub-micron particles in an electroless metal deposit, such as nickel, can enhance the wear, abrasion resistance and/or lubricity of the deposit over base substrates and conventional electroless deposits. Composites containing fluoropolymers, such as polytetrafluoroethylene (PTFE), natural and synthetic (polycrystalline) diamonds, ceramics, chromium carbide, silicon carbide, and aluminum oxide have been co-deposited in formulations of the prior art.

One commonly used composite material in an electroless nickel plating bath is PTFE. In order to enable dispersions of PTFE particles (or other codeposited materials) to perform adequately in the plating bath, surface active agents must be added to the bath. However, the addition of certain surface active agents can lead to the formation of electroless composite films having an irregular pattern.

U.S. Pat. No. 6,273,943 to Chiba et al., the subject matter of which is herein incorporated by reference in its entirety, discusses that electroless composite plating solutions are significantly shorter in life than electroless plating solutions containing no composite material such as PTFE powder. Another problem noted by Chiba et al. is that the resultant composite film has satin-like or lusterless appearance, thus leading to the likelihood of the surface being roughened and the occurrence of various types of appearance defects. Chiba et al. also note that in the use of electroless composite plating solutions, the deposition rate is slow and that the plating solution is likely to decompose.

Various methods have been suggested to ensure the formation of composite films of uniform appearance having a high content of particles codeposited. For example, U.S. Pat. No. 5,232,744 to Nakamura et al., the subject matter of which is herein incorporated by reference in its entirety, describes an electroless plating bath for the electroless deposition of a composite film consisting essentially of a metal matrix and water-insoluble particles or fibers dispersed therein comprising an amine or ammonium salt added to the electroless plating bath to enable the formation of a composite film of good uniform appearance having an increased content of particle or fibers codeposited therein.

As is readily seen, there is a need for an improved electroless composite plating solution that has good performance, a good deposition rate and uniformity of the resultant film. In addition there is a need for a plating solution that has a long life, is low in cost and easy to handle, and that is stable in performance together with a good appearance, even after long-term use of the plating bath. In particular, there is a need for a stable PTFE dispersion that continues to work as the plating bath ages and that can produce an electroless nickel deposit with greater than 20 percent by volume of PTFE in the deposit.

To that end, the inventors have discovered that the use of a low viscosity silicone glycol surfactant in PTFE dispersions added to an electroless nickel plating bath can provide an improved composite coating on the surface of a substrate.

SUMMARY OF THE INVENTION

The inventors herein have discovered an improved polytetrafluoroethylene dispersion in water. Specifically the inventors have discovered that polyoxyalkoxylated silicon glycol surfactants, when added to aqueous polytetrafluoroethylene dispersions, produce improved dispersion characteristic. Preferred polyoxyalkoxylated silicon glycol surfactants have low viscosities of about 30 to 60 centistokes when measured at 25° C. Glycerol also produces improved aqueous dispersions of polytetrofluoroethylene and works synergistically with the foregoing polyoxyalkoxylated silicone glycol surfactants to produce optimum results.

The foregoing improved dispersions are particularly suited for use in electroless plating baths such as electroless nickel plating baths. Use of the foregoing improved dispersions in electroless plating baths yield plated deposits with increased dispersion content.

DETAILED DESCRIPTION OF THE PREFERRED EMBODIMENTS OF THE INVENTION

The inventors have discovered that the use of a low viscosity silicone glycol surfactant in a polytetrafluoroethylene dispersion used with an electroless nickel plating bath produces beneficial results, as compared to PTFE dispersion baths of the prior art. By low viscosity what is meant is a silicone glycol surfactant having a viscosity at 25° C. of between 30 and 60 centistokes (cSt), preferably between 40 and 50 cSt.

Silicone glycol surfactants combine the advantages of dimethyl silicone fluids with conventional, non-ionic surfactants. Products of this class are described as having a polydimethylsiloxane backbone modified by the attachment of polyoxyalkylene chains. The ability to vary the length of the dimethylsiloxane chain (silicone) and the number, size and composition of the attached oxyalkylene chains (surfactant) allows for the preparation of a variety of silicone surfactant products. One suitable silicone glycol surfactant contains a polydimethylsiloxane backbone modified with the chemical attachment of polyoxyalkylene chains, and is marketed by BASF, Inc. under the tradename Masil® SF-19.

The inventors of the present invention have determined that the addition of a low viscosity silicone glycol surfactant, such as Masil® SF-19 aids in the manufacture of a PTFE dispersion in several ways. First, the surfactant keeps foam generation low. In addition, the surfactant helps to keep the dispersion stable as the mixing temperature rises. The inventors have observed that mixing can continue to above 200° F. (93° C.) without the loss of the dispersion. Finally, the use of the silicone glycol surfactant helps prepare a dispersion that makes it easier to obtain a stable electroless nickel deposit with more than 20% by volume of PTFE in the deposit.

In addition to adding a silicone glycol surfactant to compositions of the invention, the inventors have also found that glycerin may be used in place of isopropyl alcohol, which is normally used in PTFE dispersions. While the use of isopropyl alcohol greatly facilitates the wetting of the PTFE during the mixing process, when isopropyl alcohol is used, if the temperature during mixing goes above about 160° F. (55° C.), the PTFE to wetting agent bond is lost and the PTFE dispersion is broken. While other glycols, such as propylene glycol or hexylene glycol could also be used to allow higher temperature mixing, glycerin seems to be unique among these materials in that it also helps to boost the percent PTFE content in the electroless nickel deposit.

While the silicone glycol surfactant and the glycerol can each separately produce a better dispersion than the prior art, the inventors have found that the combination of silicone surfactant and glycerol in PTFE dispersions of the invention surprisingly produces a much better dispersion than the use of each separately. The use of both materials has been found to result in higher percentages of PTFE in the deposit, to generate less foam during mixing, and to result in lower particle size and range of particle size in the dispersion than when only one of the two additives is used.

PTFE dispersions of the invention also preferably contain other wetting agents. These wetting agents tend to be either fluorocarbon or non-fluorocarbon wetting agents that are either cationic or non-ionic. Generally, anionic wetting agents are not usable in the dispersions of the invention, because they will react with the cationic wetting agent. The cationic wetting agent is preferred in dispersions of the invention because it puts a negative charge on the PTFE particle, allowing it to be drawn to the surface of the object being plated during the electroless nickel plating process. The use of non-ionic wetting agents in the dispersions of the invention assists in keeping the dispersions stable. While either fluorocarbon or non-fluorocarbon wetting agents may be used, dispersions of the invention preferably contain at least one fluorocarbon wetting agent.

The PTFE dispersions of the invention are generally added to a conventional electroless nickel plating bath containing a source of nickel ions, a hypophosphite compound, a pH adjusting compound, and a complexing (chelating) agent for the metal ions to prevent their premature precipitation from the bath. The pH adjusting compound may be an acid, hydroxide, or ammonia depending on the chemical make-up of the plating bath.

The inventors have achieved good results when about 2 to 12 ml/l of the PTFE dispersion is added to the plating bath, achieving 20 to 24 percent by volume PTFE in the deposit when the plating bath is new, and 20 to 26 percent by volume PTFE in the deposit as the plating bath ages.

The invention will now be described with reference to the following non-limiting examples.

Example 1

Using a Silverson® L4RT high shear mixer, a dispersion was prepared using the following materials:

| | |
|---|---|
| Fluorad FC 135 | 12 gm |
| Fluorad FC 170 | 1 gm |
| Isopropyl Alcohol | 12 gm |
| Water | 375 gm |
| Zonyl ® MP - 1000 PTFE Powder | 600 gm |

Fluorad FC 135 is a cationic fluorinated wetting agent. Fluorad FC 170 is a nonionic fluorinated wetting agent. Both materials were manufactured by the 3M Corporation. The water, alcohol and wetting agents were mixed together. With the mixer running at about 5000–6000 rpm, the PTFE powder was slowly added in small amounts. Once all the PTFE powder had been wetted into the dispersion, mixing was continued for about one hour. The temperature was then allowed to rise to not more than about 155–160° F. (60–65° C.), and the dispersion was allowed to cool to room temperature.

An Elnic 101C5 electroless nickel plating bath (comprising nickel sulfate, sodium hypophosphite, complexing agents for the nickel ions and ammonium hydroxide as a pH adjustor) was prepared according to the Technical Data Sheet for this product making a 20% solution of the Elnic 101C5. The pH was adjusted with ammonia to about 4.9–5.0. Then, 2–12 mL/L of the PTFE dispersion was added. The resulting plating bath was used to plate electroless nickel/PTFE deposits, which were analyzed for PTFE content. The results are shown in Table 1.

TABLE I

Dispersion in Bath vs. PTFE in Deposit Example 1

| Dispersion Added (mL/L) | % PTFE (v/v) |
|---|---|
| 2 mL | 4% |
| 4 mL | 7% |
| 6 mL | 12% |
| 8 mL | 14% |
| 10 mL | 15% |
| 12 mL | 16% |

Example 2

A second dispersion was prepared as in Example 1 except the following materials were used and the mixing was continued until the temperature reaches 170–175° F. (77–79° C.). Since the Fluorad FC 135 and the FC 170 both have isopropyl alcohol, the mixture of the FC135, FC 170 and Glycerin was heated to 85° C. for about 1.5 hours in a drying oven to evaporate the isopropyl alcohol before proceeding with the preparation of the dispersion. Isopropyl alcohol will be shown to be detrimental in a subsequent example.

| | |
|---|---|
| Fluorad FC135 ®[1] | 12 gm |
| Fluorad FC 170 ®[1] | 1 gm |
| Masil ® SF 19[2] | 3 gm |
| Glycerin | 11 gm |
| Water | 373 gm |
| Zonyl MP ®[3] - 1000 PTFE Powder | 600 gm |

[1]Available from 3-M Company
[2]Available from BASF Company
[3]Available from Dupont Company The resulting dispersion was added to the same type of Elnic 101C5 plating bath. Deposits were obtained from the plating baths with 2–12 mL/L of the dispersion added to the bath. The deposits were analyzed and results shown in Table II.

TABLE II

Dispersion in Bath vs. PTFE in Deposit Example 2

| Dispersion Added (mL/L) | % PTFE (v/v) |
|---|---|
| 2 mL | 20.6% |
| 4 mL | 21.5 |
| 6 mL | 24.2 |
| 8 mL | 24.3 |
| 10 mL | 21.2 |
| 12 mL | 21.7 |

Table II shows that the percent PTFE has a maximum of 20–24% by volume. This is true when the plating bath is new. As the bath ages the maximum practical level for this formulation rises to about 20–26% by volume.

Example 3

A dispersion was prepared as in Example 2 except that some isopropyl alcohol was added to the mixture. The mixing was continued until the temperature rose to 170–175° F. (77–79° C.).

| | |
|---|---|
| Fluorad FC 135 ® | 12 gm |
| Fluorad FC 170 ® | 1 gm |
| Masil ® SF 19 ® | 3 gm |
| Glycerin | 11 gm |
| Isopropyl Alcohol | 5 gm |
| Water | 368 gm |
| Zonyl MP ® - 1000 PTFE Powder | 600 gm |

A plating bath was prepared using the same type of Elnic 101C5 as in the other examples but 6 mL/L of this dispersion was added to the bath. The deposit obtained had 13% by volume of PTFE. The addition of the alcohol has lowered the deposit content of PTFE compared with the similar dispersion without the alcohol.

Example 4

A dispersion was made as in Example 2 except that the glycerin was omitted. The mixing was continued until the temperature rose to 170–175° F. (77–79° C.). Again, the isopropyl alcohol in the Fluorad FC 135 and Fluorad FC 170 is evaporated before proceeding with the preparation of the dispersion.

| | |
|---|---|
| Fluorad FC 135 ® | 12 gm |
| Fluorad FC 170 ® | 1 gm |
| Masil ® SF 19 ® | 3 gm |
| Water | 384 gm |
| Zonyl MP ® - 1000 PTFE Powder | 600 gm |

A series of plating baths were prepared using the same type of Elnic 101C5 as in the other examples with 2–10 mL/L of the dispersion. Deposits were plated from these plating baths and the deposit analyzed for percent PTFE. The results are shown in Table III.

TABLE III

Dispersion in Bath vs. PTFE in Deposit Example 4

| Dispersion Added mL/L | % PTFE (v/v) |
|---|---|
| 2 mL | 7.0 |
| 4 mL | 18.8 |
| 6 mL | 20.4 |
| 10 mL | 23.0 |

EXAMPLE 5

A dispersion was made as in Example 2 except that the Masil® SF 19 was omitted. The mixing was continued until the temperature rose to 170–175° F. (77–79° C.). Again, the isopropyl alcohol in the Fluorad FC 135 and Fluorad FC 170 is evaporated before proceeding with the preparation of the dispersion.

| | |
|---|---|
| Fluorad FC 135 ® | 12 gm |
| Fluorad FC 170 ® | 1 gm |
| Glycerin | 11 gm |
| Water | 376 gm |
| Zonyl MP-1000 ® PTFE Powder | 600 gm |

A series of plating baths were prepared using the same type of Elnic 101C5 as in the other examples with 2–10 mL/L of the dispersion. Deposits were plated from these plating baths and the deposit analyzed for percent PTFE. The results are shown in Table IV.

TABLE IV

Dispersion in Bath vs. PTFE in Deposit Example 5

| Dispersion Added mL/L | % PTFE (v/v) |
|---|---|
| 2 mL | 4.3% |
| 4 mL | 17.6% |
| 6 mL | 19.4% |
| 10 mL | 23.4% |

Examples 4 and 5 show that the use of glycerin and Masil® SF 19 by themselves produce good deposits with fairly high PTFE content. However, when used together under similar conditions, the combined process produces higher PTFE content in the deposits with smaller amounts of dispersion used in the electroless nickel plating bath.

Particle size is an important measure of the effectiveness of a dispersion. The dispersions are made with PTFE that is nominally 400 nanometers or so in size. The particles are received agglomerated into much larger size clumps. The task at hand is to prepare a dispersion where the agglomeration is reduced to the lowest possible level. The dispersion particle sizes prepared for the examples listed here were measured using the NiComp "Submicron Particle Sizer". The instrument provides the mean particle size and the spread of the size range as the standard deviation. Ideally, the particles should be as small as possible and the size range very narrow. Table V lists the results of the size measurements for these dispersions.

TABLE V

Size Measurements of Dispersions

| Dispersion | Mean Particle Size nanometers | Standard Deviation |
| --- | --- | --- |
| Example 1 | 450 | 4 |
| Example 2 | 355 | 1 |
| Example 3 | 400 | 4 |
| Example 4 | 360 | 3 |
| Example 5 | 404 | 3 |

The results shown in Table V reinforce the results shown in the examples. The use of glycerin and/or a low viscosity silicone glycol surfactant individually provides an improved dispersion as compared to the prior art. However, dispersions prepared with both materials perform better still.

What is claimed is:

1. An aqueous polytetrafluoroethylene dispersion comprising a low viscosity silicone glycol surfactant and polytetrafluoroethylene powder.

2. A polytetrafluoroethylene dispersion according to claim 1, wherein the dispersion also comprising at least one material selected from the group consisting of cationic wetting agents, non-ionic wetting agents, and combinations thereof.

3. A polytetrafluoroethylene dispersion according to claim 2, wherein said cationic wetting agent is present in the dispersion in an amount of about 10–15 grams/1000 grams of dispersion.

4. A polytetrafluoroethylene dispersion according to claim 2, wherein said non-ionic wetting agent is present in the dispersion in an amount of about 5–15 grams/1000 grams of dispersion.

5. A polytetrafluoroethylene dispersion according to claim 2, wherein at least one of said cationic wetting agent and said non-ionic wetting agent comprises a fluorocarbon wetting agent.

6. A polytetrafluoroethylene dispersion according to claim 1, wherein said silicon glycol surfactant is present in the dispersion in an amount of about 1–10 grams/1000 grams of dispersion.

7. A polytetrafluoroethylene dispersion according to claim 1 wherein the dispersion also comprises glycerine.

8. A polytetrafluoroethylene dispersion according to claim 1, wherein said polytetrafluoroethylene powder is present in said dispersion in an amount of about 500–700 grams/1000 grams of dispersion.

9. A polytetrafluoroethylene dispersion according to claim 1, wherein said low viscosity silicone glycol surfactant has a viscosity of about 30–60 centistokes.

10. A polytetrafluoroethylene dispersion according to claim 9, wherein said low viscosity silicone glycol surfactant has a viscosity of about 40–50 centistokes.

11. A polytetrafluoroethylene dispersion according to claim 1, wherein said polytetrafluoroethylene powder has a nominal particle size of about 350 to 450 nanometers.

12. A polytetrafluoroethylene dispersion according to claim 11, wherein said polytetrafluoroethylene powder has a nominal particle size of about 400 nanometers.

13. An improved electroless nickel composite plating bath comprising:

a) a source of nickel ions;
b) a hypophosphite compound;
c) a pH adjusting compound;
d) a complexing agent for the nickel ions; and
e) a polytetrafluoroethylene dispersion comprising:
  i) a low viscosity silicone glycol surfactant; and
  ii) polytetrafluoroethylene powder.

14. An improved electroless nickel composite plating bath according to claim 13, wherein the dispersion also comprises at least one material selected from the group consisting of cationic wetting agents, and non-ionic wetting agents, and combinations thereof.

15. An improved electroless nickel composite plating bath according to claim 14, wherein said cationic wetting agent is present in the dispersion in an amount of about 10–15 grams/1000 grams of dispersion.

16. An improved electroless nickel composite plating bath according to claim 14, wherein said non-ionic wetting agent is present in the dispersion in an amount of about 5–15 grams/1000 grams of dispersion.

17. An improved electroless nickel composite plating bath according to claim 14, wherein at least one of said cationic wetting agent and said non-ionic wetting agent comprises a fluorocarbon wetting agent.

18. An improved electroless nickel composite plating bath according to claim 13, wherein said silicon glycol surfactant is present in the dispersion in an amount of about 1–10 grams/1000 grams of dispersion.

19. An improved electroless nickel composite plating bath according to claim 13 wherein the dispersion also comprises glycerine.

20. An improved electroless nickel composite plating bath according to claim 13, wherein said polytetrafluoroethylene powder is present in said dispersion in an amount of about 500–700 grams/1000 grams of dispersion.

21. An improved electroless nickel composite plating bath according to claim 13, wherein said low viscosity silicone glycol surfactant has a viscosity of about 30–60 centistokes.

22. An improved electroless nickel composite plating bath according to claim 21, wherein said low viscosity silicone glycol surfactant has a viscosity of about 40–50 centistokes.

23. An improved electroless nickel composite plating bath according to claim 13, wherein said polytetrafluoroethylene powder has a nominal particle size of about 350 to 450 nanometers.

24. An improved electroless nickel composite plating bath according to claim 23, wherein said polytetrafluoroethylene powder has a nominal particle size of about 400 nanometers.

25. An improved electroless nickel composite plating bath according to claim 13, wherein said polytetrafluoroethylene dispersion is present in said plating bath in an amount of about 2–12 milliliters per liter of plating bath.

26. An improved electroless nickel composite plating bath according to claim 13, wherein said pH adjusting compound is ammonia and the pH of said plating bath is about 4.9 to 5.0.

* * * * *